No. 883,112. PATENTED MAR. 24, 1908.
B. JACOB.
COMBINED CARPENTER'S TOOL.
APPLICATION FILED MAY 21, 1907.
2 SHEETS—SHEET 1.
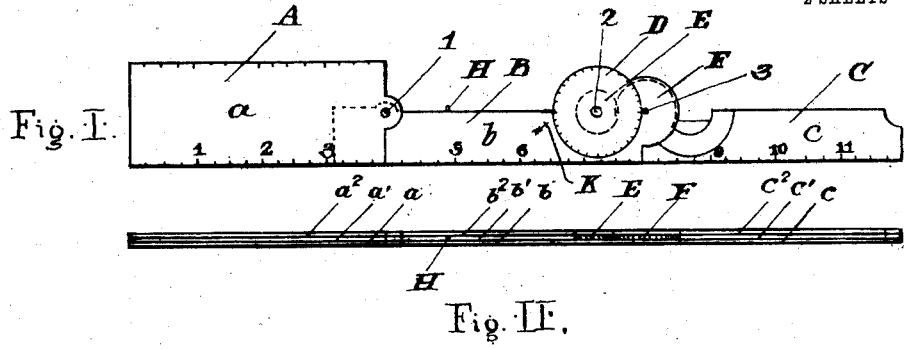
Fig. I.
Fig. II.
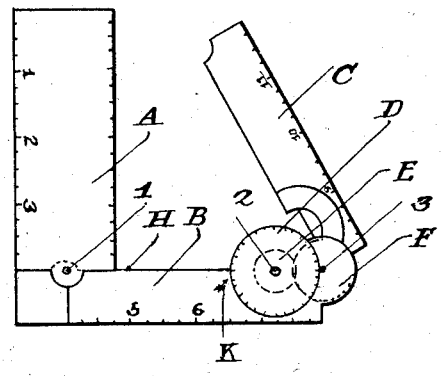
Fig. III.
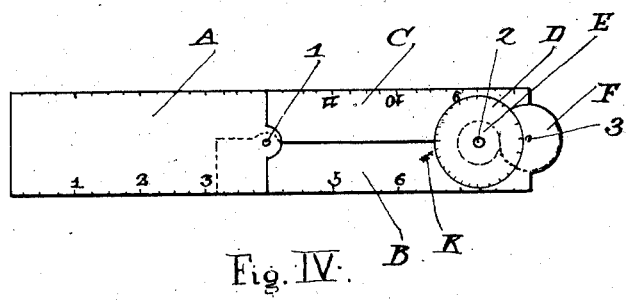
Fig. IV.
WITNESSES:
Edgar W. Shaw.
Thomas Kearny
INVENTOR
Bartholomew Jacob
BY
Pierpont Davis
ATTORNEY
THE NORRIS PETERS CO., WASHINGTON, D. C.

No. 883,112. PATENTED MAR. 24, 1908.
B. JACOB.
COMBINED CARPENTER'S TOOL.
APPLICATION FILED MAY 21, 1907.
2 SHEETS—SHEET 2.
Fig. V.
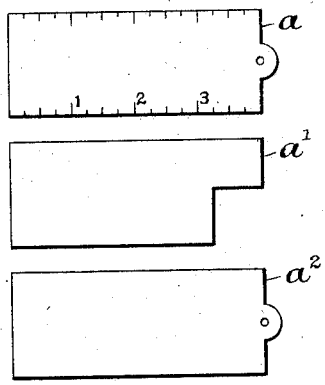
Fig. VI.
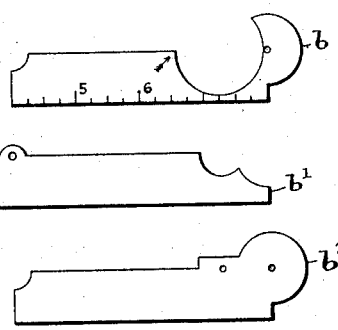
Fig. VII.
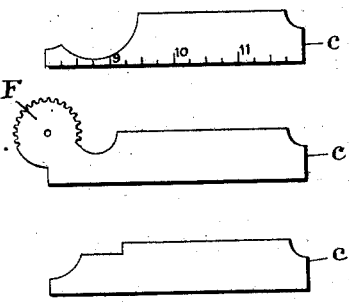
Fig. VIII.
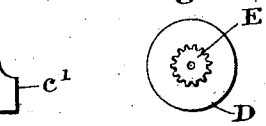
Witnesses:
Wesley E. Perry.
Erskine B. Esag.
Inventor:
Bartholomew Jacob
by Pierpont Davis
Attorney.

UNITED STATES PATENT OFFICE.

BARTHOLOMEW JACOB, OF NEW ROCHELLE, NEW YORK.

COMBINED CARPENTER'S TOOL.

No. 883,112.  Specification of Letters Patent.  Patented March 24, 1908.

Application filed May 21, 1907. Serial No. 374,876.

*To all whom it may concern:*

Be it known that I, BARTHOLOMEW JACOB, a citizen of the United States, residing at New Rochelle, in the county of Westchester, State of New York, have invented new and useful Improvements in a Combined Carpenter's Tool, of which the following is a specification.

My invention relates to a combined square, protractor, and ruler for use by carpenters, draftsmen, and architects, and has for its object to provide a simple instrument adapted for use as a square and a ruler and to be employed for measuring and determining angles of any degree whatsoever and further its object is to provide a device flush and level on both sides which may be folded similar to a folding ruler, thus rendering it convenient to carry in the pocket. I attain these objects by the mechanism illustrated in the accompanying drawing.

Figure I is a plan view of my improved carpenter's tool. Fig. II is an edge elevation of the same. Fig. III is a plan view illustrating the use of the square and the protractor. Fig. IV is a plan view illustrating my improved carpenter's tool when folded and in portable shape. Fig. V shows plan views of plates, $a$, $a^1$, and $a^2$ of which section A is composed. Fig. VI shows plan views of plates $b$, $b^1$, and $b^2$ of which section B consists. Fig. VII shows plan views of plates $c$, $c^1$, and $c^2$ of which section C is composed. Fig. VIII is plan view of inner side of dial D to which cogged wheel E is rigidly attached.

Similar letters and numbers refer to similar parts throughout the several views of my drawing.

The device representing my invention consists of three sections, A, B, C, of similar thickness, hinged together by means of pins or rivets at points 1 and 3. Each section consists of three plates riveted together. Section A consists of plates $a$, $a^1$, $a^2$; section B, plates $b$, $b^1$, $b^2$; and section C, plates $c$, $c^1$, $c^2$.

Section B is provided with an arc-like depression or cut near hinge 3, extending through section B as far as plate $b^2$. In this depression or cut dial D which is graduated into 180 degrees is sunk so that it is flush and level with surface of plate $g$ of section B. Cogged wheel E, as shown in Fig. VIII, is rigidly attached to dial D on inner side of latter and both rotate on pin 2 which extends through section B and is rigidly attached to plate $b^2$, cogged wheel E meshing with cogged arc-like end F of plate $c^1$ of section C. Both dial D and cogged wheel E may be rigidly attached to pin 2 instead, the latter rotating in socket in plate $g^2$, and the same result will be attained. Section B is also provided with catch H, and pointer K on the exterior of plate $b$. Section C is provided with an arc-like depression or cut near hinge 3 extending through said section in part as far as plate $c^1$ and also in part as far as plate $c^2$ which space the upper part of cogged wheel E and dial D will occupy when section C is folded over parallel to and flush with section B, so that when the device is in that folded position, the sunken space caused by the combination of both said depressions or cuts in sections B and C respectively, will be a complete circle and will be completely occupied by said cogged-wheel E and dial D, the latter being flush and level with plates $b$, and $c$ of sections B and C respectively.

Section B is provided with an extension at hinge 1 which fits into section A when the latter is extended. When section A is swung upward into a position at right angles with section B, said extension completes the carpenter's square. This extension is constructed by means of plate $b^1$ being nearly a quarter again as long as the other plates $b$ and $b^2$ of section B.

Although my improved carpenter's tool may be of any dimensions it is preferable that the top and bottom plates of each section viz. $a$, $a^2$, $b$, $b^2$, and $c$, $c^2$, should be four inches in length so that when the tool is extended to its full length as may be seen in Fig. I it will be exactly one foot long. Dial D should be about $1\frac{3}{8}$ inches in diameter, cogged-wheel E about one inch in diameter and cogged-end F of plate $c^1$ of section C, one inch in diameter, the size of the gear being 24 and 48, so that a half turn of cogged-end F will cause a full turn of cogged-wheel E and consequently of dial D.

It is preferable that the material with which this device should be constructed be metal or a combination of metal and wood.

It is not essential that each one of sections A, B, and C be constructed by means of three plates as has been described. Each section may consist of a single piece, each piece being drilled, cast, or formed in a manner corresponding to the construction brought about by the combination of three plates riveted together as described above.

The chief attribute of my improved tool is that it is absolutely flush and level on both sides when section C is folded parallel with section B and is in portable shape, there being no projections whatsoever on either side, either in the nature of rivets, hinges, or clamping-bolts; and whether the tool is folded or being used as a square, ruler or for the purpose of determining angles it can be placed perfectly flat on a plane surface either side up.

The device representing my invention should be operated as follows: By an upward movement of section A to a position at right angles with section B, the device becomes a carpenter's square. The positions of A, and B just described may be seen in Fig. III. When section A is extended and section C is swung upwards, dial D will rotate by means of the cogs described as aforesaid, and the size of the angle formed by the position in which section C has been placed may be read off pointer K marked upon the exterior of section B, as illustrated in Fig. III. When the device is extended to its full length as seen in Fig. I it may be used as a ruler. When section A is extended and section C is swung into a position parallel with section B, as illustrated in Fig. IV, the device is then in portable shape, section C being flush and level with section B and held in place by means of catch H.

Having described my invention, what I claim as new and desire to secure by Letters Patent of the United States is:

1. In an improved carpenter's tool, the combination of two arms hinged together for the purpose of angular movements and foldable parallel to and flush with each other; a graduated dial sunk in one arm near the hinge end, rigidly attached to a pin extending through said arm; a cogged-wheel rigidly attached to said pin on inner side of said dial, meshing with cogged arc-like end of other arm, so that a movement of the latter will cause said dial to rotate, substantially as described.

2. In an improved carpenter's tool, the combination of two arms hinged together for the purpose of angular movements and foldable parallel to and flush with each other; a graduated dial sunk in one arm near the hinge end; a cogged-wheel rigidly attached to said dial on inner side of latter, both dial and cogged-wheel rotating on a pin extending through and rigidly attached to said arm, said cogged-wheel meshing with cogged arc-like end of other arm, so that a movement of the latter will cause said dial to rotate, substantially as described.

3. In an improved carpenter's tool, the combination of sections B and C of similar thickness, graduated on either side, each consisting of three plates riveted together, $b$, $b^1$, $b^2$, and $c$, $c^1$, $c^2$, respectively, which sections are hinged together for the purpose of angular movements and foldable parallel to and flush with each other; graduated dial D sunk in section B and flush with the surface thereof, rigidly attached to pin 2; cogged-wheel E rigidly attached to pin 2 on inner side of dial D, meshing with cogged arc-like end F of plate $c^1$ of section C; and pointer K on exterior of section B; said sections when folded being flush and level on both sides; all of said parts operating substantially as described.

4. In an improved carpenter's tool, the combination of sections B and C of similar thickness, graduated on either side, each consisting of three plates riveted together, $b$, $b^1$, $b^2$, and $c$, $c^1$, $c^2$, respectively, which sections are hinged together for the purpose of angular movements and foldable parallel to and flush with each other; graduated dial D sunk in section B and flush with the surface thereof; cogged-wheel E rigidly attached to dial D on inner side of latter, both said dial and cogged-wheel rotating on pin 2 extending through and rigidly attached to plate $b^2$ of section B, cogged-wheel E meshing with cogged arc-like end F of plate $c^1$ of section C; and pointer K on exterior of section B; said sections when folded being flush and level on both sides, all of said parts operating substantially as described.

5. In an improved carpenter's tool, the combination of sections A, B, and C, of similar thickness, graduated on either side, each consisting of three plates riveted together $a$, $a^1$, $a^2$; $b$, $b^1$, $b^2$; and $c$, $c^1$, $c^2$, respectively, sections A and B being hinged together for the purpose of forming an angle of ninety degrees and no less, plate $b^1$ of section B extending at hinge 1 further than plates $b$ and $b^2$ of said section and fitting into section A between plates $a$, $a^2$, when section A is extended and completing a square corner when section A is at an angle of ninety degrees with section B; sections B and C being hinged together for the purpose of angular movements, and foldable parallel to and flush with each other when section A is extended to one hundred and eighty degrees; graduated dial D sunk in section B and flush with the surface thereof, rigidly attached to pin 2 extending through section B; cogged-wheel E rigidly attached to pin 2 on inner side of said dial D, meshing with cogged arc-like end F of plate $c^1$ of section C; and pointer K on the exterior of section B; said sections B and C when folded as aforesaid being flush and level with each other and with section A on both sides; all of said parts operating substantially as described.

6. In an improved carpenter's tool, the combination of sections A, B, and C, of similar thickness, graduated on either side, each consisting of three plates riveted together $a$, $a^1$, $a^2$; $b$, $b^1$, $b^2$; and $c$, $c^1$, $c^2$, respectively; sections A and B being hinged together for the purpose of forming an angle of ninety degrees and no less, plate $b^1$, of section B extending at hinge 1 further than plates $b$ and $b^2$ of said section and fitting into section A between plates $a$ and $a^2$ when section A is extended, and completing a square corner when section A is at an angle of ninety degrees with section B; sections B and C being hinged together for the purpose of angular movements, and foldable parallel to and flush with each other when section A is extended to one hundred and eighty degrees; graduated dial D sunk in section B and flush with the surface thereof; cogged-wheel E rigidly attached to dial D on inner side of latter; both said dial and cogged-wheel rotating on pin 2 extending through and rigidly attached to plate $b^2$ of section B, cogged-wheel E meshing with cogged arc-like end F of plate $c^1$ of section C; and pointer K on the exterior of section B; said sections B and C when folded as aforesaid being flush and level with each other and with section A on both sides; all of said parts operating substantially as described.

BARTHOLOMEW JACOB.

Witnesses:
   JOSEPH MAAS,
   EDGAR W. SHAW.

Corrections in Letters Patent No. 883,112.

It is hereby certified that in Letters Patent No. 883,112, granted March 24, 1908, upon the application of Bartholomew Jacob, of New Rochelle, New York, for an improvement in "a Combined Carpenter's Tool," errors appear in the printed specification requiring correction, as follows: In line 51, page 1, the reference letter "g" should read $b$; in line 60, same page, the reference letter "$g^2$" should read $b^2$, and in line 95, same page, the word "one" should read *one-half*; and that the said Letters Patent should be read with these corrections therein that the same may conform to the record of the case in the Patent Office.

Signed and sealed this 14th day of April, A. D., 1908.

[SEAL.]

C. C. BILLINGS,
*Acting Commissioner of Patents.*